United States Patent

Heffernan et al.

Patent Number: 5,728,243
Date of Patent: Mar. 17, 1998

[54] TIRE BALANCING

[76] Inventors: Michael Heffernan, R.R. #6, Simcoe, Ontario, Canada, N3Y 4K5; Russel J. Freeman, 10 Oakes Boulevard, Vittoria, Ontario, Canada, N0E 1W0

[21] Appl. No.: 655,964

[22] Filed: May 31, 1996

Related U.S. Application Data

[62] Division of Ser. No. 251,507, May 31, 1994.

[30] Foreign Application Priority Data

Jun. 17, 1994 [WO] WIPO ............ PCT/CA94/00344

[51] Int. Cl.$^6$ ............ F16F 15/36; G01M 1/30
[52] U.S. Cl. ............ 156/75; 152/154.1
[58] Field of Search ............ 152/154.1, 450, 152/504, 521; 156/75

[56] References Cited

U.S. PATENT DOCUMENTS

| | | | |
|---|---|---|---|
| 2,687,918 | 8/1954 | Bell et al. | |
| 2,909,389 | 10/1959 | Wilborn | 152/154.1 |
| 3,008,506 | 11/1961 | Hicks | 152/450 |
| 3,077,914 | 2/1963 | Fritts | 152/154.1 |
| 3,230,999 | 1/1966 | Hicks | 152/540 |
| 3,312,265 | 4/1967 | Turner et al. | 152/450 |
| 3,404,719 | 10/1968 | Priest et al. | 152/450 |
| 3,463,551 | 8/1969 | Clay | 152/154.1 |
| 3,747,660 | 7/1973 | Tibbals | 152/504 |
| 4,109,549 | 8/1978 | Vincent | |
| 4,137,206 | 1/1979 | Kent | 523/166 |
| 5,073,217 | 12/1991 | Fogal | 156/75 |
| 5,083,596 | 1/1992 | Kato et al. | 152/154.1 |

FOREIGN PATENT DOCUMENTS

| | | |
|---|---|---|
| 1570398 | 7/1980 | United Kingdom. |
| 2047736 | 12/1980 | United Kingdom. |
| 2074955 | 11/1981 | United Kingdom. |

*Primary Examiner*—Geoffrey L. Knable
*Attorney, Agent, or Firm*—McDonnell Boehnen Hulbert & Berghoff

[57] ABSTRACT

A method and composition of matter for balancing tire and rim assemblies of vehicles is disclosed wherein the composition of matter has rounded balancing elements of different sizes to line the interior of a tire casing and to move over the lining to offset points of imbalance.

8 Claims, 2 Drawing Sheets

TIRE BALANCING

This is a divisional of application Ser. No. 08/251,507, filed May 31, 1994.

BACKGROUND AND SUMMARY OF THE INVENTION

This invention relates to an improvement in a method of balancing tires using a free flowing material within a tire casing and in the composition of said material.

Most tire and rim assemblies require balancing to prevent vibration within the vehicle while it is in motion. One currently popular, method of balancing tire and rim assemblies involves rotation of the assembly on a computerized balancing machine to determine the location and size of weights necessary to obtain balanced rotation. Lead weights of the determined size are then clamped to the assembly at the indicated points to complete the balancing procedure. There are other similar "fixed weight" systems known for tire balancing. Some disadvantages of this type of system are that tire balancing equipment is expensive, tire balancing requires a skilled operator and is time consuming, and tires must be rebalanced at regular intervals due to effects of varying tread wear.

Continuous self balancing systems overcome many of the disadvantages of the above fixed weight systems. Continuous self balancing systems use the principle that free flowing materials contained in a vessel in rotation will seek a distribution in balance about the centre of rotation and will tend to offset, by mass damping, any imbalance inherent in the vessel. The effectiveness of a dynamic balancing system is dependent in part on the ease with which balancing material can move within the vessel to positions which offset points of imbalance.

In one application of this principle an annular ring is placed circumferentially about a rim and partially filled with heavy materials that will flow under the influence of centrifugal force. One such balancer uses mobile weights such as ball bearings which are free to roll to any point on the ring. The effectiveness of this method is limited by the roundness of the ball bearings, the concentricity of the ring to the geometric axis and the inherent rolling resistance of the balls in the ring.

Liquids have been attempted in self balancing systems to improve the mobility of the balancing material. U.S. Pat. No. 2,687,918 to Bell discloses an annular robe attached to a tire rim partially filled with mercury for continuous balancing of the tire and rim assembly. Several disadvantages exist for this method, the principal ones being high cost and toxicity of mercury, the difficulty of ensuring concentricity of the annular robe and the need for special rims.

The use of free flowing powdered materials in balancing compensators was taught in U.S. Pat. No. 4,109,549, in which an annular tube was filled with other dense materials such as powdered tungsten.

A different means for applying the self balancing principle was disclosed in U.S. Pat. No. 5,073,217 to Fogal. A free flowing balancing powder was placed directly within a pneumatic tire, instead of within a concentric annular tube. Pulverent polymeric/copolymeric synthetic plastic material in the range of 8-12 screen size and 40-200 screen size were disclosed. The patent taught that the powder within the tire would distribute within the tire under centrifugal forces to dampen vibration. Placing the balancing media within the tire has two primary advantages. The balancing force is positioned close to the point of imbalance and extraneous annular rings are not required. The disadvantage of Fogal is that powdered products produced from a grinder or pulverizer tend to have particles with an irregular shape which increases resistance or friction to fluidity. It is unlikely that heavy liquids, such as mercury, could be substituted advantageously in Fogal's application, however, both because of above mentioned safety reasons and because such liquids may be incompatible with or corrosive to the composition of a tire.

It is an object of the present invention to provide a method of tire balancing using an improved solid particulate material within a tire casing to obtain better fluidity for more efficient balancing of a tire and rim assembly.

The present invention uses the known principle of balancing through mass damping and the known method of using a solid materials within a pneumatic tire to obtain a dynamic balance while the wheel is in rotation. The improvement of this invention lies primarily in the composition of the mixture of the balancing material. The mixture comprises small, dense beads and larger, less dense beads. Beads of a substantially rounded shaped reduce friction and improve the mobility of the material during balancing.

The small, dense beads may be formed of atomized metallic particles which form during atomization as tiny balls. Corrosion resistant metal such as bronze, brass, zinc, tin, copper, stainless steel, nickel or silver or alloys of same may be used. Selection may be made after consideration of factors such as cost, availability and suitability for forming into small rounded shapes. In preferred embodiments the metallic component is selected from bronze, brass or zinc and atomized to form tiny balls, hereafter called "micro-spheres". The micro-spheres have round surfaces which permit them to roll over each other with less friction than sharp edged particles. The metallic micro-spheres have the greatest density (about 5-9 gr/cm3) of the materials in the mixture so that they are urged to the outside of the other materials during rotation. The small size of the micro-spheres enables them to filter through the other materials during rotation. The interior circumference of a tire is usually riddled with small pockets and ridges produced during the tire moulding process. These surface defects cause erratic movement of the balancing media and reduce its effectiveness. During rotation the micro-spheres are forced against the tire casing to fill in imperfections or voids on the tire wall to form a smooth lining which allows the remaining balancing media to move about the tire casing with less impediment. The excess of the micro-spheres, after voids and ridges are levelled, act as part of the balancing material and move to offset points of imbalance.

The larger, less dense beads are also rounded and may be formed from glass, ceramics, alumina, corderite, porcelain or titanates. These beads function as the primary balancing material and form the largest portion by weight of the mixture. Glass spheres or beads of density 2-3 gr/cm3 are preferred. The glass beads are larger but less dense than the metallic micro-spheres. Thus the glass beads tend to ride over the metallic micro-spheres to move easily to points of imbalance to dampen vibrational energy. The glass beads are more durable than thermoplastic particles of Fogal and less prone to degradation.

The mixture may also include a partitioning agent, such as vermiculite, mica or other monoclinic non-reactive crystalline minerals, to separate and lubricate the mixture to enable all components of the mixture to maintain free-flowing characteristics. Vermiculite is preferred.

A suitable desiccant, such as silica gel, Al2O3, CaCl2 or CaSO4 may be added to the mixture to prevent agglomeration in the presence of moisture. Silica Gel is preferred as a desiccant to maintain a dry atmosphere in the tire casing. The small particles used in this type of balancing system tend to be hydroscopic and may agglomerate in the presence of moisture. Agglomerated particles will cause a dramatic reduction in balancing efficiency. The silica gel tends to ameliorate this condition.

A preferred mixture of this invention is as follows.

| MATERIAL | SIZE | CONCENTRATION |
|---|---|---|
| Non-ferrous atomized metal (e.g., bronze or brass) | 80–325 mesh | 10–25% |
| Glass beads (Lead free-soda lime type) | 20–40 mesh | 40–80% |
| Vermiculite | 20–325 mesh | 10–30% |
| Silica Gel | 20–40 mesh | 2–4% |

It has been found that this invention will work effectively with any conventional multi-wheel vehicle tire and rim assembly. It will be appreciated, however, that the amount of material to balance a particular assembly will vary in quantity and proportion, according to the type of assembly and the size of the tire and rim assembly. Correct amounts and proportions may be determined empirically by persons skilled having the benefit of this disclosure and the current state of the art. To illustrate in general terms, a steering tire of a truck (11×24.5) may require about 400 grams while a truck driving tire may require 500 grams of the mixture. Automobile tires may require only 160 grams of the mixture but are much more sensitive to vibration than truck tires and therefore require more vehicle specific and careful measuring.

BRIEF DESCRIPTION OF THE DRAWINGS

In the figures which illustrate a preferred embodiment of this invention.

DETAILED DESCRIPTION OF THE DRAWINGS

In the figures illustrating this invention like numerals indicate like elements.

Figure 1:
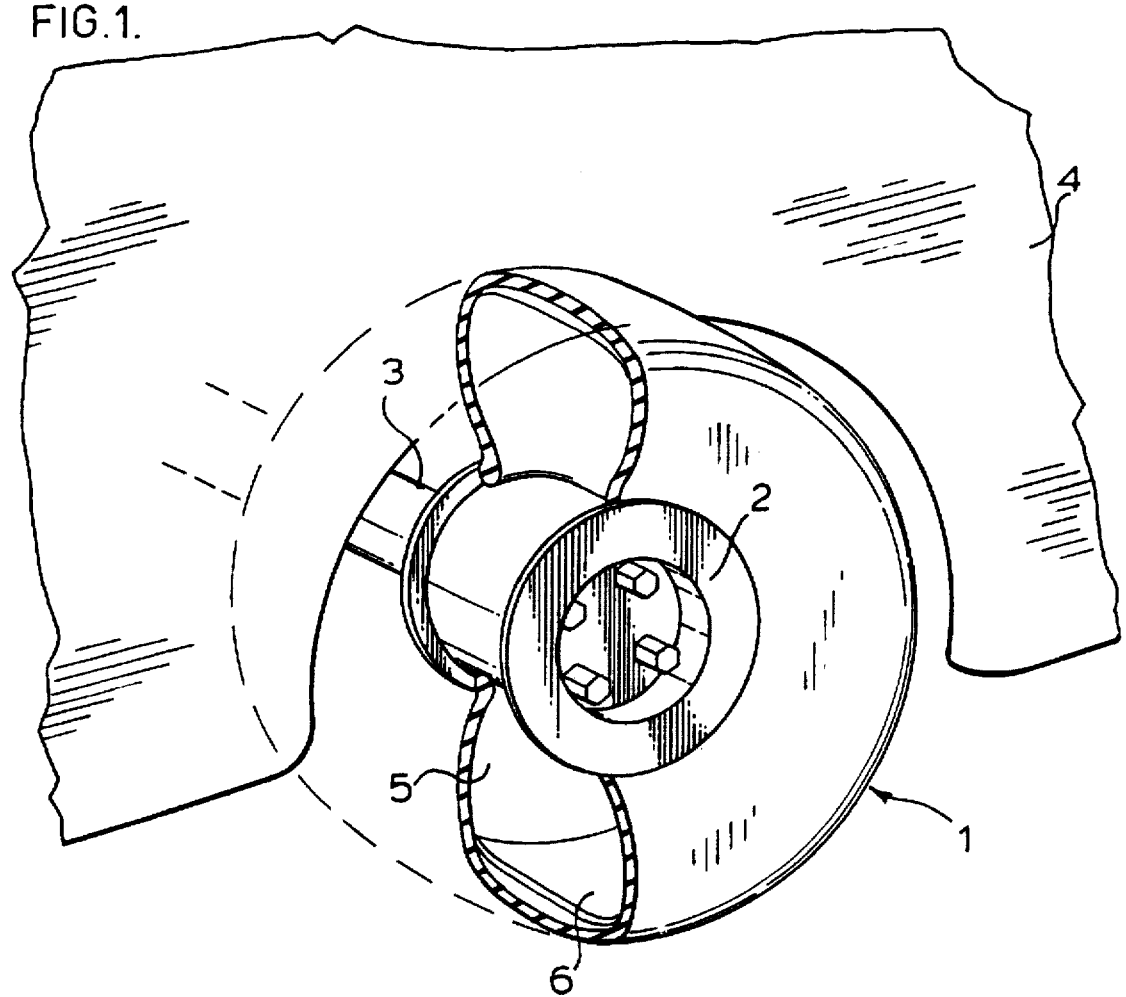
FIG. 1 is an illustration of a tire and rim assembly cut away to show the interior of the tire casing having the balancing material of this invention.

In FIG. 1, a tire (1) is shown mounted on a rim (2) which, in turn, is mounted on an axle (3) of a vehicle (4). The interior of the tire casing (5) is ordinarily filled with air. The balancing material (6) of this invention lies about the periphery of the tire casing (5) while the wheel is in rotation by reason of the centrifugal force exerted on the material (6).

Figure 2:
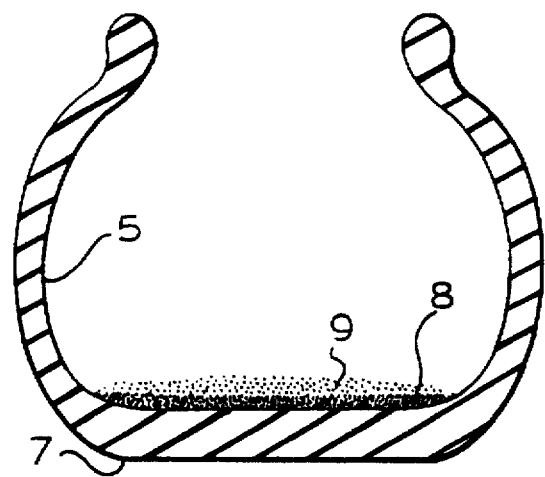
FIG. 2 is an illustration of a cross section of a tire and rim assembly showing the balancing material of this invention.

As illustrated in FIG. 2, the interior of the tire casing (5) has many voids and surface irregularities (7) (which are accentuated in the illustration).

The atomized metal micro-spheres (8) are shown to lie in and about the surface irregularities (7) of the tire casing (5). The micro-spheres (8) fill the voids and surface irregularities (7) and form a smooth, slippery surface for movement of the remainder of the balancing material. The excess of the micro-spheres acts as balancing material. Glass beads (9) roll over the micro-spheres (8) and act as the primary balancing material. Vermiculite (not shown) and silica gel (not shown) are interspersed in the material to act as a lubricant and a desiccant, respectively.

The preferred proportions of the balancing mixture for use in truck tires is as follows:

| atomized metal | 17% |
|---|---|
| glass beads | 70% |
| vermiculite | 10% |
| silica gel | 3% |

For automobile tires, the preferred mixture is:

| micro-spheres | 24% |
|---|---|
| glass beads | 65% |
| vermiculite | 9% |
| silica gel | 2% |

In operation, the balancing mixture may be poured into a new tire casing as it is assembled onto a rim. In tire rim assemblies previously constructed, the sealing bead about the rim may be broken and the mixture poured into the tire casing. Alternatively the mixture may be poured into the valve stem or mixed with the air which pressurizes the tire. Once a tire on a vehicle begins to route, the balancing material (6) distributes itself within the tire casing (5). As the speed of rotation increases, the metallic micro-spheres (8) tend to filter to the outside adjacent the tire casing and to fill the voids and surface irregularities (7), thereby forming a smooth inner surface. The lighter and larger glass spheres (9) then roll over the micro-spheres to adjust to a position opposite a point of imbalance (10).

Figure 3:
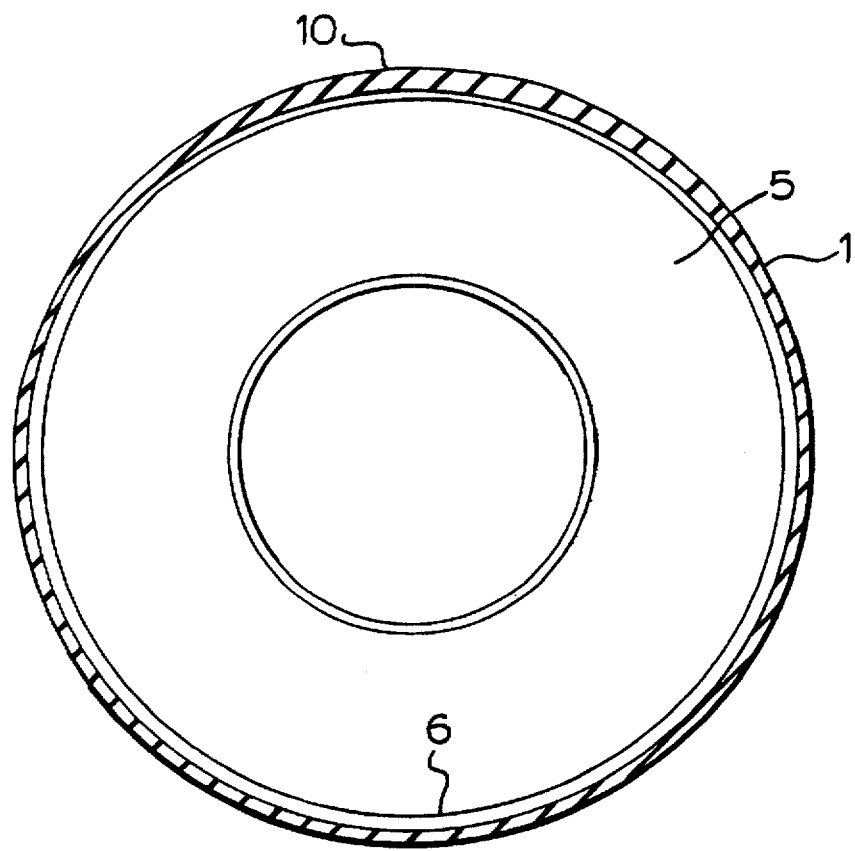
FIG. 3 is a side sectional view of a tire showing the distribution of the mixture of this invention.

As illustrated in FIG. 3, the material (6) distributes within the tire casing (5) so that a thicker portion of the material (6) lies opposite the point of imbalance (10), while some of the balancing material (6) is distributed about the entire inner surface of the tire casing (5). The distribution of the balancing material (6) acts as mass damping to overcome the eccentric force which would otherwise be introduced by the point of imbalance (10), so that the tire (1) turns smoothly.

We claim:

1. A method for balancing a tire rim assembly comprising the steps of, providing a tire rim assembly having a hollow tire casing surrounding a space about the rim, said space to be filled and pressurized with air;

pouring a mixture into the interior of the tire casing, said mixture comprising a first weight portion of first beads of atomized metallic micro-spheres having a first density and a first size and a second weight portion of second beads of glass having a second density and second size wherein said first weight portion is less than said second weight portion, said first density is greater than said second density and said first size is smaller than said second size; and rotating the tire rim assembly to distribute the material within the tire casing to offset forces of imbalance.

2. The method of claim 1 in which the first portion is in a range of 10% to 30% by weight, the second portion is in a range of 60% to 80% by weight and where the mixture includes a third portion in the range of 5% to 15% by weight of a mixture of vermiculite having a specific gravity in the range of 2–3 and a mesh size in the range of 20–325.

3. The method of claim 1 in which the first portion is in a range of 10% to 30% by weight, the second portion in a range of 60% to 80% by weight and where the mixture includes a third portion in the range of 5% to 15% by weight of the mixture of vermiculite having a specific gravity in the range of 2-3 and a mesh size in the range of 20-325 and a fourth portion in the range of 1% to 5% by weight of the mixture of silica gel of a mesh size in the range of 20-40.

4. The method of claim 1 in which the tire casing is a track tire where the atomized metallic micro-spheres are in the range from 15% to 20% by weight of the mixture, the glass beads are in the range of 65% to 75% of the mixture, and where the mixture also includes vermiculite in the range of 7% to 12% by weight of the mixture and silica gel in the range of 2% to 4% by weight of the mixture.

5. The method of claim 1 in which the tire casing is a track tire where the atomized metallic micro-spheres comprise 17% by weight and are composed of metal selected from the group consisting of brass, bronze and zinc, the glass beads comprise 70% by weight of lead-free soda lime glass, and further characterized in that the mixture contains 10% by weight of vermiculite and 3% by weight of silica gel.

6. The method of claim 1 in which the tire casing is an automobile tire and the atomized metallic micro-spheres are in the range of 20% to 30% of the mixture by weight, the glass beads are in the range of 60% to 70% by weight and the mixture also contains vermiculite in the range of 5% to 12% by weight and silica gel in the range of 1% to 3% by weight.

7. The method of claim 1 in which the tire casing is an automobile tire and the atomized metallic micro-spheres comprise 24% by weight and are composed of metal selected from the group consisting of brass, bronze and zinc, the glass beads comprise 65% by weight of lead-free soda lime glass and further characterized in that the mixture contains 9% by weight vermiculite and 2% by weight silica gel.

8. A method for balancing a tire rim assembly comprising the steps of, providing a tire rim assembly having a hollow tire casing surrounding a space about the rim, said space to be filled and pressurized with air;

pouring a mixture into the interior of the tire casing, said mixture comprising a first portion in a range of 15% to 30% by weight of the mixture of first beads of atomized metallic micro-spheres having a specific gravity in the range of 5-9 and a mesh size in the range of 80-325; and a second portion in a range of 70% to 85% by weight of the mixture of second beads of glass having a specific gravity of 2-3 and a mesh size in the range of 20-40; and rotating the tire rim assembly to distribute the material within the tire casing to offset forces of imbalance.

* * * * *